United States Patent [19]
Caveney

[11] 3,996,646
[45] Dec. 14, 1976

[54] CABLE TIE AND METHOD FOR MAKING SAME

[75] Inventor: Jack E. Caveney, Hinsdale, Ill.

[73] Assignee: Panduit Corporation, Tinley Park, Ill.

[22] Filed: Feb. 4, 1976

[21] Appl. No.: 655,312

Related U.S. Application Data

[63] Continuation of Ser. No. 495,012, Aug. 5, 1974, abandoned.

[52] U.S. Cl. .............................................. 24/16 PB
[51] Int. Cl.² ........................................ B65D 63/00
[58] Field of Search ......... 24/16 PB, 73 PB, 74 PB, 24/150 FP, 30.5 P, 274 R

[56] References Cited
UNITED STATES PATENTS

| | | | |
|---|---|---|---|
| 515,747 | 3/1894 | Carr | 24/16 PB |
| 2,346,906 | 4/1944 | Cheney | 24/274 B |
| 3,147,522 | 9/1964 | Schulmm | 24/16 PB |
| 3,237,255 | 3/1966 | Stauton | 24/16 PB |
| 3,398,440 | 8/1968 | Bergstrom | 24/274 B |
| 3,530,544 | 9/1970 | Burniston | 24/16 PB |
| 3,840,018 | 10/1974 | Heiftz | 24/274 R |

FOREIGN PATENTS OR APPLICATIONS

| | | | |
|---|---|---|---|
| 1,212,605 | 10/1959 | France | 24/16 PB |
| 226,487 | 5/1969 | Sweden | 24/20 CW |

Primary Examiner—G. V. Larkin
Attorney, Agent, or Firm—Charles R. Wentzel; Richard B. Wakely

[57] ABSTRACT

A self-locking cable tie for forming a plurality of wires or the like into a bundle. The tie comprises a stretched elongate flexible strap portion for positioning about the wires. The strap portion is made of a plastic material comprising stretch-oriented molecules. An integral head portion extends from one end of the strap portion and has a strap entrance face, a strap exit face, and a generally transverse aperture extending from the strap entrance face to the strap exit face for receiving the distal end of the strap portion. The aperture has a predetermined strap path therethrough. The tie also includes a locking means non-integral with the head portion and which has a free end portion extending into the strap path and toward the strap exit face. The free end portion and the strap portion each have an engageable component for causing a localized stress concentration in the strap portion. Insertion of the distal end of the strap portion into the aperture from the strap entrance face causes the strap portion to interfere with and to deflect the free end portion to permit tightening of the tie around the wires. The engageable components cause the localized stress concentration in the strap portion upon application of withdrawal forces to enable the free end portion to pierce the strap portion and prevent retrograde movement thereof.

26 Claims, 16 Drawing Figures

CABLE TIE AND METHOD FOR MAKING SAME

This is a continuation of applicaton Ser. No. 495,012 filed Aug. 5, 1974, and now abandoned.

As a method of making a cable tie from a molded part having an elongate strap portion made of a plastic material comprising stretch-orientable molecules, the invention comprises several steps. The molded part includes a head portion having a strap entrance face, a strap exit face, and a generally transverse aperture extending between the faces. The aperture includes a predetermined strap path therethrough. The method includes the following steps:

a. stretching the strap portion in its longitudinal direction until its molecular structure is oriented; and b. securely inserting locking means whih has a free end portion into the head portion to provide an interference fit between the strap portion and the free end portion, the last-mentioned two portions each having an engageable component for causing a localized stress concentration in the strap portion upon application of withdrawal forces to the strap portion so that the free end portion can pierce the strap portion and prevent retograde movement thereof.

BACKGROUND OF THE INVENTION

This invention relates to cable ties and more particularly to self-locking cable ties molded from a stretch-oriented plastic material.

Heretofore cable ties have been molded to the dimensions of the end product. In order for such ties to meet tensile strength requirements, the strap portions of such ties had a relatively large cross-sectional area. This large area was required because the molecules of the molded thermoplastic material were relatively unoriented and, accordingly, the material lacked the strength of material which was stretch-oriented. Additionally, difficulties were encountered in molding ties having a long strap portion because increased heat and pressure were required to completely fill the mold cavity. The increased heat may tend to cause degradation of the thermoplastic material while the increased pressure could cause the mold to pump open (flash). Examples of prior art molded cable ties are shown in U.S. Pat. Nos. 3,186,047 and 3,660,869.

Straps of stretched thermoplastic material have been proposed for bundling packages or a plurality of objects and for attaching tags and buttons to clothing. Examples of such straps are shown in U.S. Pat. Nos. 3,444,597 and 3,447,207. Such prior art straps have usually not been self-locking and required separate crimp connectors for application to an overlapped portion of the strap.

One self-locking stretched strap has been proposed which includes an elongate strap portion having a plurality of transverse rungs and a head portion having an integral locking pawl which is biased to a position between consecutive rungs. Of course, it has only locking positions corresponding to the rungs. As it is not infinitely adjustable, in certain applications it only provides a loose bundle or an overly tight bundle. Such a ladder construction also requires a long head to ensure there is a rung to engage the pawl upon cutoff of the strap tail flush with the head. A long head is also needed because sufficient space is required between consecutive rungs to allow pawl movement therebetween. Of course, longitudinal stretching of such a strap causes only the sides to increase in tensile strength because the rungs are not stretched significantly. Since the rungs do not contribute to the tensile strength of the material, such a structure results in an inefficient use of material. Also, this type of strap does not provide a uniform pressure on the bundle because of the alternate rungs and apertures and because the sides are harder than the rungs. Nonuniform pressure on the bundle could cause an undesirable stress concentration on the bundled wires. Reference may be made to U.S. Pat. No. 3,766,608.

SUMMARY OF THE INVENTION

Among the several objects of the present invention may be noted the provision of an improved cable tie; the provision of such a cable tie which has high tensile strength with reduced cross-sectional area and which, accordingly, requires much less material for fabrication; the provision of such a cable tie which is self-locking and infinitely adjustable, the provision of such a tie which provides generally uniform pressure on the bundled wires and provides reduced bundle weight; the provision of such a tie which has a low profile head, and the provision of such a cable tie which is reliable in use, has long service life, and is simple and economical to manufacture. Other objects and features of the invention will be in part pointed out hereinafter, and in part apparent.

Briefly, a self-locking cable tie of the present invention for forming a plurality of wires into a bundle comprises a stretched elongate flexible strap portion for positioning about the wires, an integral head portion extending from one end of the strap portion, and a locking means carried by the head portion. The strap portion is made of a plastic material comprising stretch-oriented molecules. The head portion includes a generally transverse aperture for receiving the strap portion and extends between head portion strap entrance and strap exit faces. The aperture includes a predetermined strap path therethrough. The locking means is non-integral with the head portion and has a free end portion extending into the strap path and toward the strap exit face. The free end porton and the strap portion have engageable components for causing a localized stress concentration in the strap portion. Accordingly, insertion of the distal end of the strap portion into the aperture from the strap entrance face causes the strap portion to interfere with and deflect the free end portion to permit tightening of the tie. Upon application of withdrawal forces, the engageable components cause the localized stress concentration to enable the free end portion to pierce the strap portion and prevent retrograde movement thereof.

A method of making a cable tie from a molded part made of a plastic material comprising stretch-orientable molecules includes several steps. The molded part includes an elongate strap portion and an integral head portion extending from the strap porton having a strap entrance face, a strap exit face, and a generally transverse aperture extending between the faces. The steps of the method include:

a. stretching the strap portion in its longitudinal direction until its molecular structure is oriented; and b. securely inserting locking means which has a free end portion into the head portion to provide an interference fit between the strap portion and the free end portion when the cable tie is assembled, the last-mentioned two portions having engageable components for causing a localized stress concentration in the strap portion upon applicaion of withdrawal forces to the strap portion so that the free end porton can pierce the strap portion and prevent retrograde movement thereof.

BRIEF DESCRIPTION OF THE DRAWINGS

Corresponding reference characters indicate corresponding parts throughout the several views of the drawings.

DESCRIPTION OF THE PREFERRED EMBODIMENT

Referring to FIGS. 1–5, an as-molded part is generally indicated at reference numeral 19. As will appear hereinafter, part 19 is stretched, cut, and provided with a locking means 21 to form a self-locking high strength cable tie 23, shown in FIGS. 6–8 and 10–11, of the present invention, for forming a plurality of wires 25, see FIG. 16, into a bundle which, usually has a generally circular cross section. Cable tie 23 comprises an elongate flexible strap portion 27 made of a thermoplastic material, such as nylon, comprising stretch-oriented molecules; and an integral head portion 29 extending from one end of strap portion 27, having a strap entrance face 31 and a strap exit face 33, and having a generally transverse aperture 35 from face 31 to face 33 for receiving the distal end of strap portion 27. Aperture 35 includes a generally V-shaped strap entry section extending from strap entrance face 31 and a generally flat strap exit section extending from strap exit face 33. The purposes of these sections will appear hereinafter. Cable tie 23 also includes an elongate tail 37 extending from strap portion 27. Tail 37 is preferaly bent out of the longitudinal direction of strap portion 27 towards strap entrance face 31. Components of part 19, see FIG. 1, corresponding to components of cable tie 23 except for stretching and/or cutting are designated by a prime.

As-molded nylon parts have relatively unoriented molecules. Stretching of the part causes orientation of the molecular structure in the direction of the stretch. After stretching, although the part is reduced in cross section, it has high tensile strength and breaking strength. That is, stretching causes the tensile strength of the material to increase. Also the stretching causes hardening of the material.

Figure 1:
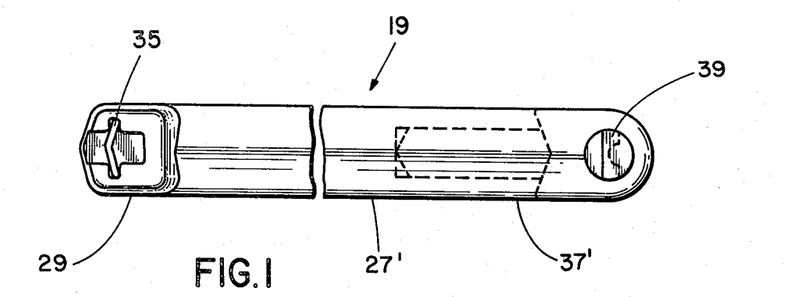
FIG. 1 is a plan of a molded part before stretching and cutting to form, in part, a cable tie of the present invention.
Figure 2:
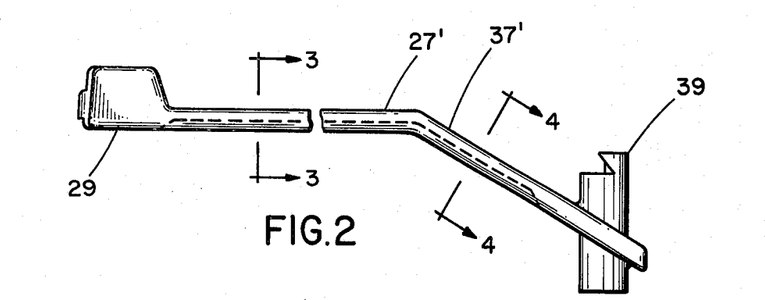
FIG. 2 is a front elevational view of the part of FIG. 1.
Figures 3, 4, 5:
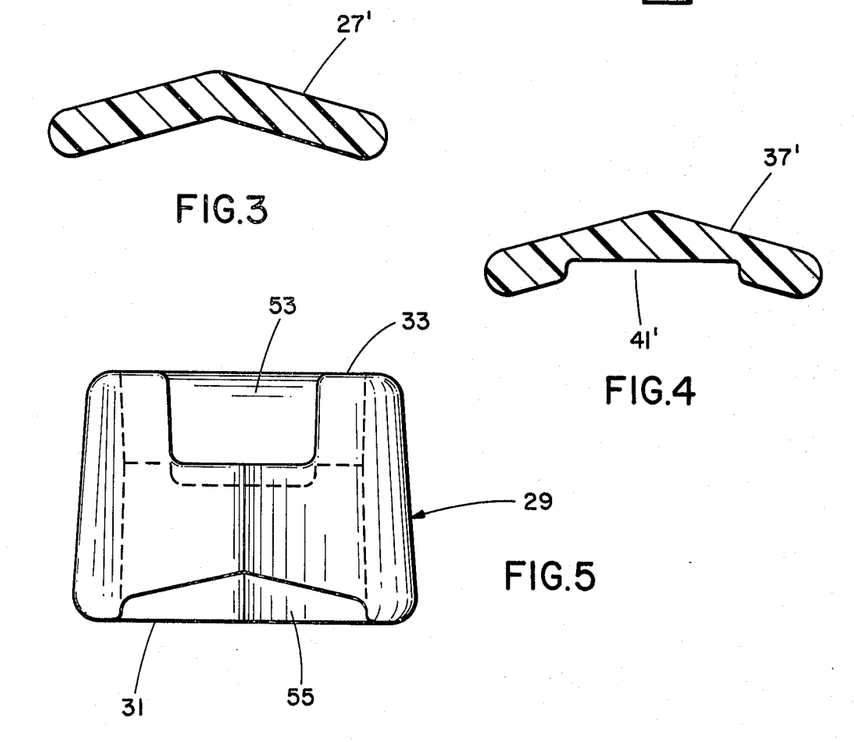
FIG. 3 is a sectional view generally on line 3—3 of FIG. 2.
FIG. 4 is a sectional view generally on line 4—4 of FIG. 2.
FIG. 5 is a side elevational view of a head portion of the part of FIG. 1.
Figure 6:
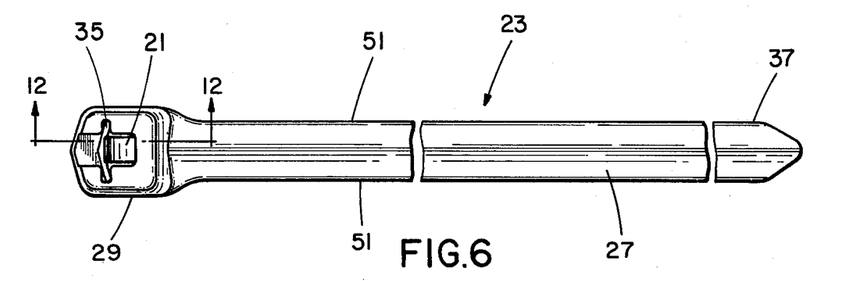
FIG. 6 is a plan of the cable tie formed from the part of FIG. 1 after stretching and cutting and after alocking means has been inserted into the head portion of the tie.
Figure 7:
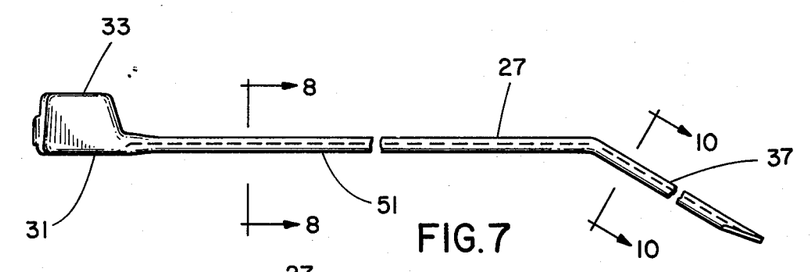
FIG. 7 is a front elevational view of the cable tie of FIG. 6.

As shown in FIGS. 1 and 2, as-molded part 19 includes a pulling lug 39 extending in opposite directions from tail 37'. Before stretching, the cross section of strap portion 27' may be significantly larger than the cross section of aperture 35. Part 19 is stretched between lug 39 and the junction of strap portion 27' and head portion 29 until the molecular structure of the nylon in the strap porton is oriented and, preferably, until the cross section thereof is substantially identical to that of the strap entry section of aperture 35. The length of the strap portion 27' may be increased three times, for example, during the stretching operation. Thus a long cable tie need not be molded to its final dimensions, but a relatively short tie can be molded and stretched to the desired length thereby significantly reducing the amount of material used, overcoming the problems attendant to molding a relatively long tie, and reducing the weight of the bundle. Tail 37' has an indentation 41' extending longitudinally therealong. The purpose of the indentation will appear hereinafter.

Figures 13, 14, 15, 16:
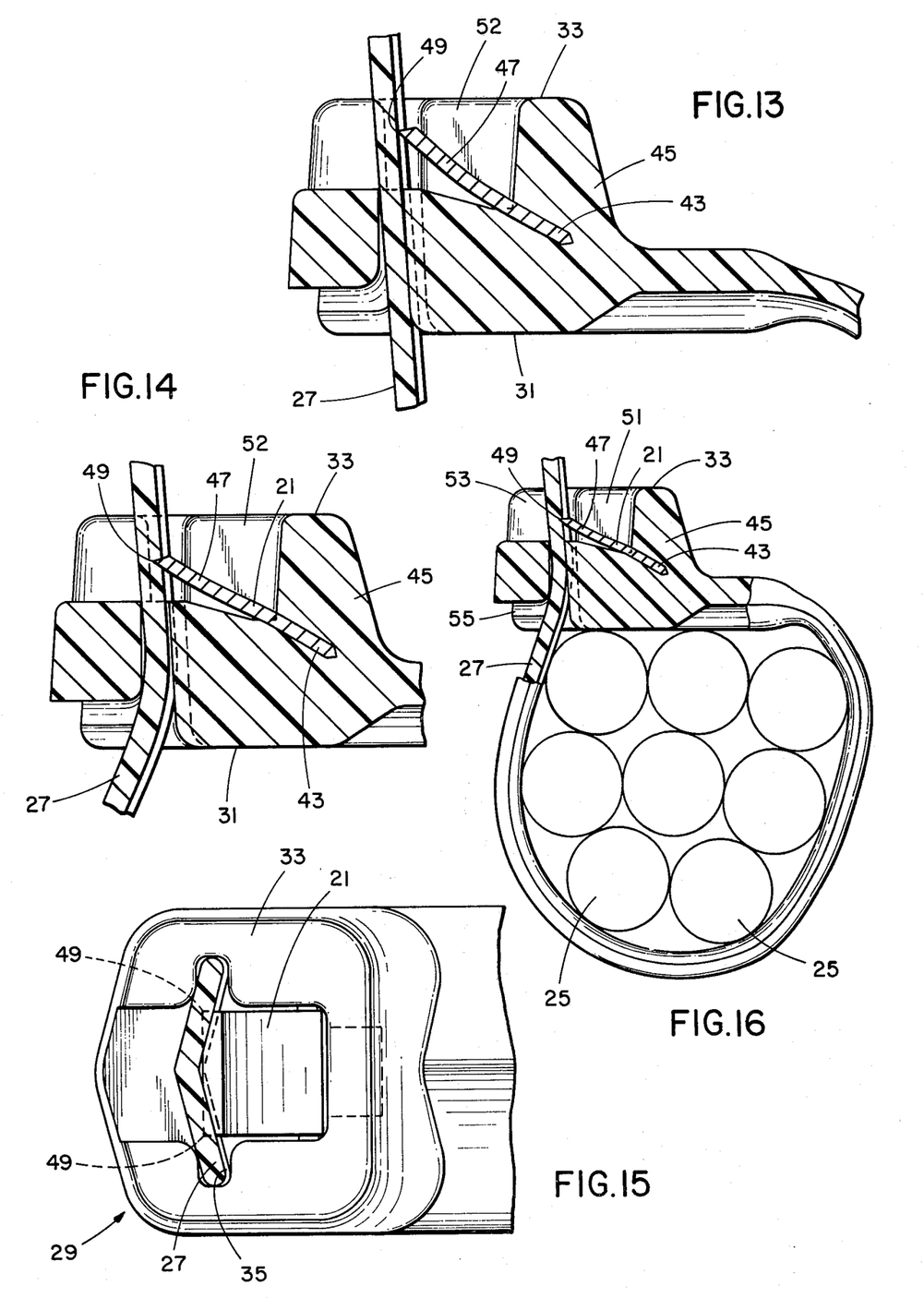
FIG. 13 is similar to FIG. 12 and shows the locking means being deflected upon insertion of a strap portion into the head portion.
FIG. 14 is similar to FIG. 12 and shows the locking means engaging the strap portion upon attempted strap withdrawal.
FIG. 15 is a plan of the head portion of the cable tie of FIG. 6 with the strap portion inserted.
FIG. 16 is a sectional view of the cable tie of FIG. 6 positioned around a bundle of wires.

Aperture 35 includes a predetermined strap path therethrough. This strap path is that portion of the aperture 35 occupied by strap portion 27 when the cable tie 23 is disposed about a wire bundle as shown in FIG. 16. Of course, for the particular embodiment shown wherein strap portion 27 and the strap entry section of aperture 35 are of substantially identical cross section, the strap path includes substantially the entire strap entry section.

Figure 11:
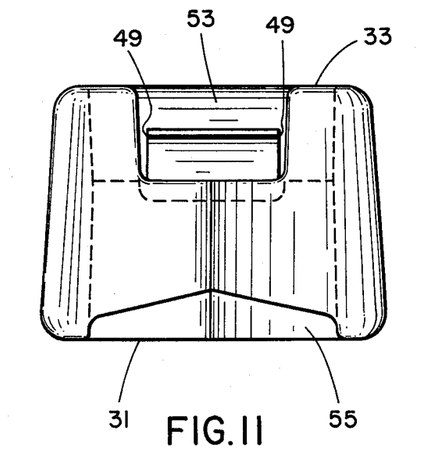
FIG. 11 is an end view of the head portion of the cable tie of FIG. 6.

Locking means 21 is non-integral with head portion 29 and is shown in FIGS. 6 and 11–16 as being constituted by a metallic barb or tongue having one end portion 43 thereof securely embedded in a reinforcing rib portion 45 of head portion 29 adjacent strap entrance face 31. Locking barb 21 extends therefrom toward aperture 35 and strap exit face 33 at an acute angle relative to the longitudinal direction of strap portion 27. Barb 21 includes a free end portion 47 having at least one pointed protuberance 49 extending into the strap path of aperture 35 for engaging strap portion 27. Of course, a point is defined by the intersection of at least three planes. Each of the pointed protuberances 49 shown in FIG. 11 is defined by the intersection of the three planes in which lie: (a) the beveled surface at the distal end of free end portion 47, (b) the facing side of the locking means shown in FIG. 11, and (c) either of the right or left edges, as viewed in FIG. 11 of the locking means. It will be appreciated that the distal end of free end portion 47 could be comprised of more than a single surface. More particularly, strap portion 27 is non-flat and is shown as having a generally V-shaped cross section, see FIG. 8, and has a pair of diverging legs lying in more than a single plane. Each of the legs has a longitudinally extending side edge 51. An alternate strap portion 27a, see FIG. 9, has an arcuate cross section and side edges 51a.

Figure 8:
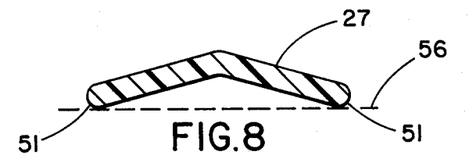
FIG. 8 is a sectional view generally on line 8—8 of FIG. 7.
Figure 9:
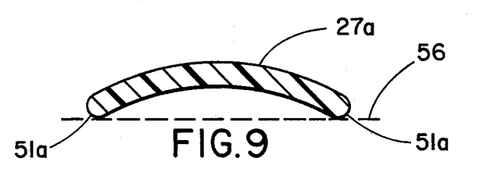
FIG. 9 is a sectional view of an alternate strap portion which has an arcuate cross section.
Figure 10:
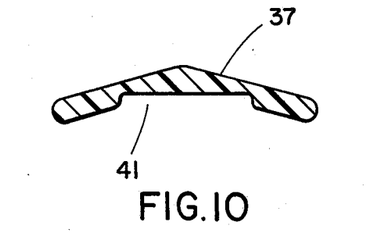
FIG. 10 is a sectional view generally on line 10—10 of FIG. 7.

The strap portion as shown in either of FIGS. 8 and 9, comprises a non-flat cross section whereby an imaginary plane as indicated at 56 in FIGS. 8 and 9, disposed parallel to the longitudinal axis of the strap portion and contacting but not intersecting the surface of that part of the cross section adjacent the strap portion edges 41, 41a, is spaced from a substantial portion of the surface between the edges and nearest the plane 56. It will be appreciated that stipules or bumps could be utilized with the present invention to prevent the tie from slipping on the bundle. Accordingly, the relationship between the plane 56 and the cross sections of FIGS. 8 and 9 ignores the nonuniform effect on the cross sections due to any such stipules. The strap portion has an inner surface that is adapted to be disposed towards the bundle after the assembly of the cable tie around the bundle and an outer surface adapted to be disposed away from the bundle after the assembly of the cable tie around the bundle. The inner and outer surfaces are joined by the edge surfaces 51, 51a, and as shown in FIGS. 8 and 9, each of the inner and outer surfaces is substantially non-flat. When cable tie 23 is positioned around a wire bundle as shown in FIG. 16, side edges 51 initially engage wires 25 to restrain sliding of the tie along the bundle. As tie 23 is tightened, strap portion 27 tends to flatten so that the tie exerts generally uniform pressure on the bundled wires. The cross-sectional non-flat shape of strap portions 27, 27a, provide the strap portion with greater column strength than a flat strap portion thus facilitating threading around a bundle, insertion of the strap through the aperture and pushing of the strap into locking engagement with the barb. It will be appreciated that the strap is normally inserted into the aperture such that it is bent in a direction opposite to the direction that it is bent in threading around the bundle. With a V-shaped cross-section, for example, the column strength of the strap portion is greater when the strap is bent with the apex of the "V" on the inside of the bend than when the strap is bent with the apex on the outside of the bend. Accordingly, maximum threading force can be applied without collapsing the pushed strap if the legs of the "V" are oriented so that they extend toward the bundle when the strap is installed. It will be appreciated that the non-flat cross section of the cable tie of the present invention could be utilized with unstretched cable ties that are either used in the as-molded condition or used after increasing the tensile strength and hardness by an alternative method, e.g. irradiation.

The strap entry section of aperture 35 is also shown as being V-shaped and has a pair of legs generally symmetrical about a plane through the longitudinal axis of strap portion 27. The legs of the strap entry section extend toward strap portion 27. Locking barb 21 is generally rectangular and generally symmetrical about the plane through the longitudinal axis of strap portion 27 with its free end 47 beveled, having a pair of pointed protuberances or projections 49 extending into the strap projection path of aperture 35. Pointed protuberances 49 are constituted by corners of the free end portion 47 of barb 21. One protuberance extends foremost into each leg of aperture 35. The generaally flat strap exit section of aperture 35 allows the strap portion to flatten as when the leading part of the strap portion is cut off flush with head portion 29.

The free end portion 47 of barb 21 and strap portion 27 can be considered to each have an engageable component for causing a localized stress concentration in the strap portion so that upon application of withdrawal forces, the free end portion 47 can pierce strap portion 27 and prevent retrograde movement thereof. The engageable components for causing a localized stress concentration include pointed protuberances 49 and that part of strap portion 27 engaged by the protuberances 49. As best shown in FIG. 15, the free end portion of barb 21 terminates in a line edge having its end points define the protuberances 49. The end points project into the strap path farther tha the line edge between the end points whereby point contact between the barb and the strap portion to be engaged is ensured. Providing such engageable components is highly desirable to ensure positive locking of the stretched cable tie. As indicated above, stretching of the strap portion causes it to harden as well as to increase in tensile and breaking strength. If a flat hardened strap portion were engaged by a barb edge, application of withdrawal forces to the strap portion could cause it to slide along the barb line edge due to lower localized stress concentration. However, if the strap portion is engaged by a pointed protuberance of the barb, application of withdrawal forces, as will appear hereinafter, causes the pointed protuberance to gouge or pierce the hardened strap portion due to the higher localized stress concentration thereby to securely hold it from retrograde movement relative to the head portion.

A rectangular barb having a line edge is relatively easy to manufacture. Accordingly, it will be appreciated that with the desire to utilize such a barb, the preferred embodiment of the present invention provides a dual function in increasing the column strength of the strap and ensuring point contact with a rectangular barb. Although a strap portion having a V-shaped cross section is shown used in conjunction with a rectangular barb because a cable tie having these features is relatively easy to manufacture, many locking means - strap portion variations are envisioned as having engageable components for causing such a high localized stress concentration in the strap portion that it is pierced by the locking means. These include a generally flat strap portion for engagement by a barb in the shape of one or more spikes and a generally flat strap portion having appendages such as stipules or one or more longitudinally extending ribs for engagement by a barb line edge, in addition to other non-flat strap configurations.

Figure 12:
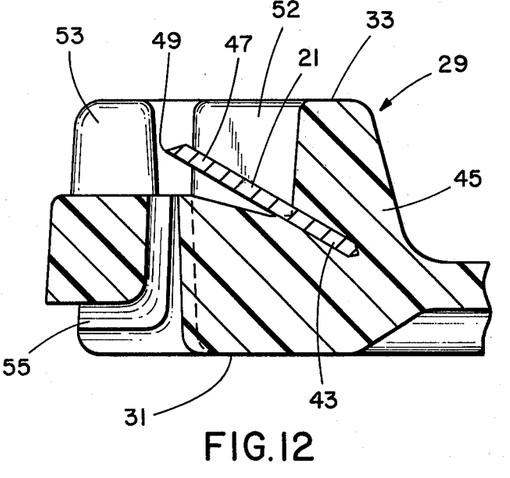
FIG. 12 is a sectional view generally on line 12—12 of FIG. 6.

As best shown in FIGS. 11 and 12, head portion 29 has a trio of slots adjoining aperture 35. A first slot 52 extends from adjacent barb end portion 43 towards strap exit face 33 to permit deflection of barb end portion 47 toward the strap exit face upon insertion of strap portion 27 into aperture 35. A second slot 53 is generally aligned with a slot 52 and extends oppositely of strap portion 27 along strap exit face 33. It will be appreciated that both slots 52 and 53 facilitate insertion of barb 21 into head portion 29. A final slot 55 is generally V-shaped and extends away from strap portion 27 along strap entrance face 31 to facilitate threading of tail 37 and to provide a nest for that section of strap portion 27 adjacent aperture 35 when cable tie 23 is disposed around a wire bundle.

Tapered tail 37 facilitates threading of strap portion 27 into aperture 35. As indicated above, tail 37 has a longitudinally extending indentation or slot 41. Slot 41 receives pointed protuberances 49 so that tail 37 can be inserted into aperture 35 without interference of barb 21. That portion of tail 37 extending from strap exit face 33 can conveniently be used as a grip for completion of tightening the tie around a wire bundle.

Operation of cable tie 23 is as follows: Strap portion 27 is positioned about the wires 25 to be bundled, and tapered tail 37 is inserted into aperture 35. When tie 23 is tightened around the bundle, strap portion 27 interferes with and deflects pointed protuberances 49 and barb end portion 47 toward strap exit face 33 as is shown in FIG. 13. It will be appreciated that during tightening, the protuberances 49 will tend to scratch the surface of strap portion 27. After the tie has been tightened around the bundle, if withdrawal forces are applied to strap portion 27, pointed protuberances 49 deflect toward strap entrance face 31 until they securely engage strap portion 27 by further piercing or gouging, see FIGS. 14 and 15, thereby to positively prevent retrograde movement of the hardened strap portion 27.

A method of making a high strength cable tie 23 from a molded part 19 of thermoplastic material comprising stretch-orientable molecules includes several steps. The molded part has an elongate flexible strap portion 27' and an integral head portion 29 extending from one end of the strap portion. Head portion 29 includes a strap entrance face 31, a strap exit face 33, and a generally transverse aperture 35 extending between the faces. Aperture 35 includes a predetermined strap projection path therethrough, and part 19 also includes a tail 37' extending from strap portion 27'. The method includes the following non-sequential steps:

stretching the strap portion in its longitudinal direction until its molecular structure is oriented; and
securely inserting locking means 21 which has a free end portion 47 into head portion 29 to provide an interference fit between the strap portion and the free end portion, the last-mentioned two portions each having an engageable component for causing a localized stress concentration in the strap portion upon application of withdrawal forces to the strap portion to enable the free end portion 47 to pierce the strap portion and prevent retrograde movement thereof.

This method also includes the further step of removing the distal end of tail 37, preferably by taper cutting to facilitate threading of strap portion 27 into aperture 35. This last-mentioned step is to be performed after stretching the strap portion.

Of course, many sizes of cable ties can be made using the method described above. For example, strap portion 27 of part 19 could be an exemplary 2 inches long and the length of strap portion 27 of cable tie 23 could be, for example, 5 inches. The stretching step of the method could be performed, for example, with the strap portion at a temperature of approximately 125° C. and at a stretching rate of one inch per second.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A self-locking cable tie for forming a plurality of wires or the like into a bundle, said tie comprising:
   a stretched elongate flexible strap portion for positioning about said wires or the like and made of a plastic material comprising stretch-oriented molecules;
   a head portion integral with said strap portion extending from one end of said strap portion, having a strap entrance face and a strap exit face, and having a generally transverse aperture extending from said strap entrance face to said strap exit face for receiving the distal end of said strap portion, said aperture having a predetermined strap path therethrough; and
   locking means made of non-plastic material and carried by said head portion and having a free end portion extending into said strap path and toward said strap exit face, said free end portion and said strap portion each having an engagable component for causing such a high localized stress concentration in said strap portion that said strap portion is pierced by said free end portion, said engageable component of said free end portion comprising at least one sharply pointed protuberance which extends foremost into said strap path whereby upon insertion of the distal end of the strap portion into said aperture from said entrance face, the strap portion interferes with and deflects said free end portion to permit tightening of said tie around said wires or the like and whereby said engageable components cause the localized stress concentration in said strap portion upon application of withdrawal forces to enable said free end portion to pierce said strap portion and prevent retrograde movement of said strap portion.

2. A tie as set forth in claim 1 wherein said strap portion has a V-shaped cross section.

3. A tie as set forth in claim 1 wherein said aperture is generally symmetrical about a plane through the longitudinal axis of the strap portion and wherein said aperture includes a strap entry section extending from strap entrance face, said strap entry section including a V-shaped portion with the legs thereof extending toward said strap portion and wherein said free end portion of the locking means has a pair of pointed protuberances extending into said strap path.

4. A tie as set forth in claim 3 wherein said locking means is a generally rectangular metallic barb which is generally symmetrical about said plane through the longitudinal axis and wherein each of said protuberances extends into one leg of said strap entry section with each pointed protuberance being constituted by a corner of said barb.

5. A tie as set forth in claim 4 wherein the V-shaped portion of said strap entry section and said strap portion have substantially identical cross sections.

6. A tie as set forth in claim 3 wherein said aperture further includes a generally flat strap exit section extending from said strap exit face and adjoining said strap entry section.

7. A tie as set forth in claim 1 wherein said strap portion has an arcuate cross section.

8. A self-locking cable tie for forming a plurality of wires or the like into a bundle, said tie comprising:
   a stretched elongate flexible strap portion for positioning about said wires or the like and being made of a plastic material comprising stretch-oriented molecules;

a head portion integral with said strap portion extending from one end of said strap portion, having a strap entrance face and a strap exit face, and having a generally transverse aperture from said strap entrance face to said strap exit face for receiving the distal end of said strap portion, said aperture having a predetermined path to be filled by said strap portion; and locking means having end portions with one of said end portions embedded in said head portion and with the other end portion extending into said predetermined path and toward said strap exit face, said other end portion having a projection for engaging said strap portion, said projection being sharply pointed with respect to that section of the strap portion to be engaged by the projection and extending foremost into said strap path whereby upon insertion of the distal end of the strap portion into said aperture from said strap entrance face, the strap portion interferes with and deflects said other end portion to permit tightening of said tie around said wires or the like and whereby said pointed projection pierces said strap portion upon application of withdrawal forces to prevent retrograde movement of said strap portion.

9. A method of making a cable tie, for forming a plurality of wires or the like into a bundle, from a molded part having an elongate flexible strap portion made of a plastic material comprising stretch-orientable molecules and further having a head portion integral with said strap portion having a strap entrance face, a strap exit face and a generally transverse aperture extending from said strap entrance face to said strap exit face, said aperture including a strap path therethrough, said method comprising the following non-sequential steps:

stretching said strap portion in its longitudinal direction until its molecular structure is oriented; and securely inserting locking means which has a free end portion into said head portion to provide an interference fit between said strap portion and said free end portion when the cable tie is assembled, the last-mentioned two portions each having an engageable component for causing such a high localized stress concentration in said strap portion that upon application of withdrawal forces to the strap portion said free end portion pierces said strap portion and prevents retrograde movement thereof, said engageable component of said free end portion comprising at least one sharply pointed protuberance which extends foremost into said strap path.

10. A self-locking cable tie for forming a plurality of wires or the like into a bundle, said tie comprising:

an elongate flexible plastic non-flat strap portion for positioning about said wires or the like, said strap portion having a pair of lateral edges for engaging the bundle and a cross section a part of which is uniform over the major length of said tie, said strap portion being shaped so that a plane parallel to the longitudinal axis of the strap portion contacts the peripheral surface of said part of the cross section adjacent said edges, but said plane does not intersect any part of said peripheral surface, with said plane spaced from most of the portion of said peripheral surface which lies between the edges and nearest the plane, said portion of said peripheral surface constituting an inner surface of said strap;

an integral head portion extending from one end of said strap portion, having a strap entrance face and a strap exit face, and having a generally transverse aperture from said strap entrance face to said strap exit face for receiving the distal end of said strap portion, said aperture including a predetermined strap path therethrough; and locking means non-integral with said head portion and carried by said head portion and having a free end portion extending into said path and toward said strap exit face, said free end portion and said strap portion each having engageable means for causing a localized stress concentration in said strap portion whereby upon insertion of the distal end of the strap portion into said aperture from said strap entrance face, the strap portion interferes with and deflects said free end portion to permit tightening of said tie around said wires or the like and whereby said engageable means causes the localized stress concentration in said strap portion upon application of withdrawal forces to enable said free end portion to pierce said strap portion and prevent retrograde movement of said strap portion, said inner surface being adapted to be disposed toward said bundle whereby when the cable tie is positioned around the bundle, the lateral edges of the strap engage the outer wires to restrain sliding of the tie along the bundle and as the tie is tightened, said strap portion tends to flatten so that the tie exerts generally uniform pressure on the bundled wires.

11. The tie of claim 10 wherein said strap portion has a generally V-shaped cross section.

12. The tie of claim 11 wherein the legs of the "V" are positioned so as to extend toward said bundle when installed.

13. The tie of claim 11 wherein said free end portion comprises a projection that is pointed.

14. The tie of claim 13 wherein said projection is pointed with respect to the strap portion to be engaged by said projection.

15. The tie of claim 10 wherein said strap portion has a generally arcuate cross section.

16. The tie of claim 15 wherein the concave surface of the arcuate cross section is positioned so as to extend toward said bundle when installed.

17. The tie of claim 15 wherein said free end portion comprises a projection that is pointed.

18. The tie of claim 17 wherein said projection is pointed with respect to the strap portion to be engaged by said projection.

19. The tie of claim 10 wherein said locking means comprises a metallic barb having the free end portion terminating in a line edge having a pair of end points, said end points projecting into said strap path farther than the line edge between said end points.

20. The tie of claim 10 wherein said free end portion comprises a projection that is sharply pointed with respect to the strap portion to be engaged by said projection and wherein the strap portion is made of a plastic material comprising stretch-oriented molecules.

21. A self-locking cable tie for forming a plurality of wires or the like into a bundle, said tie comprising:

an elongate flexible strap portion for positioning about said wires or the like and being made of a plastic material;

said strap portion having an inner surface adapted to be disposed toward said bundle after assembly of said cable tie around said bundle and an outer surface adapted to be disposed away from said bundle after assembly of said cable tie around said bundle, said inner and outer surfaces being joined by a pair of edge surfaces, each of said inner and outer surfaces being substantially non-flat over a substantial portion of the width of said strap;

an integral head portion extending from one end of said strap portion, having a strap entrance face and a strap exit face, and having a generally transverse aperture from said strap entrance face to said strap exit face for receiving the distal end of said strap portion, said aperture including a predetermined strap path therethough; and locking means non-integral with said head portion and carried by said head portion and having a free end portion extending into said path and toward said strap exit face, said free end portion and said strap portion each having an engageable component for causing a localized stress concentration is said strap portion, said edge surfaces being disposed closer the wires than most of the strap portion intermediate said edge surfaces when the strap portion is loosely positioned about the wires so that when the cable tie is positioned about the bundle, said edge surfaces engage the outer wires to restrain sliding of the tie along the bundle and as the tie is tightened, said strap portion tends to flatten and exert generally uniform pressure on the bundled wires, whereby upon insertion of the distal end of the strap portion into said aperture from said strap entrance face, the strap portion interferes with and deflects said free end portion to permit tightening of said tie around said wires or the like and whereby said engageable components cause the localized stress concentration in said strap portion upon application of withdrawal forces to enable said free end portion to pierce said strap portion and prevent retrograde movement of said strap portion.

22. The tie of claim 21 wherein said strap portion has a substantially uniform cross sectional thickness over a major portion of the strap portion length.

23. The tie of claim 21 wherein said inner and outer surfaces are substantially non-flat over a substantial portion of the width of said strap portion when the longitudinal axis of the tie is a straight line over the major length of the tie.

24. A self-locking cable tie for forming a plurality of wires or the like into a bundle, said tie comprising:

a stretched elongate flexible strap portion for positioning about said wires or the like and made of a plastic material comprising stretch-oriented molecules;

a head portion integral with said strap portion extending from one end of said strap portion, having a strap entrance face and a strap exit face, and having a generally transverse aperture extending from said strap entrance face to said strap exit face for receiving the distal end of said strap portion, said aperture having a predetermined strap path therethrough; and locking means made of non-plastic material and carried by said head portion and having a free end portion extending into said strap path and toward said strap exit face, said free end portion and said strap portion each having an engageable component for causing such a high localized stress concentration in said strap portion that said strap portion is pierced by said free end portion, one of said engageable components comprising at least one protuberance sharply pointed relative to the other engagable component, said protuberance being positioned to engage said other engageable component prior to engagement of other parts of said one engageable component with said other engageable component whereby upon insertion of the distal end of the strap portion into said aperture from said strap entrance face, the strap portion interferes with and deflects said free end portion to permit tightening of said tie around said wires or the like and whereby said engageable components cause the localized stress concentration in said strap portion upon application of withdrawal forces to enable said free end portion to pierce said strap portion and prevent retrograde movement of said strap portion.

25. A cable tie as set forth in claim 24 wherein said free end portion of said locking means comprises said protuberance.

26. A method of making a cable tie, for forming a plurality of wires or the like into a bundle, from a molded part having an elongate flexible strap portion made of a plastic material comprising stretch-orientable molecules and further having a head portion integral with said strap portion having a strap entrance face, a strap exit face and a generally transverse aperture extending from said strap entrance face to said strap exit face, said aperture including a strap path therethrough, said method comprising the following non-sequential steps:

stretching said strap portion in its longitudinal direction until its molecular structure is oriented; and securely inserting locking means which has a free end portion into said head portion to provide an interference fit between said strap portion and said free end portion when the cable tie is assembled, the last-mentioned two portions each having an engageable component for causing such a high localized stress concentration in said strap portion that upon application of withdrawal forces to the strap portion said free end portion pierces said strap portion and prevents retrograde movement thereof, one of said engageable components comprising at least one protuberance sharply pointed relative to the other engageable component, said protuberance being positioned to engage said other engageable component prior to engagement of other parts of said one engageable component with said other engageable component.

* * * * *

UNITED STATES PATENT AND TRADEMARK OFFICE
CERTIFICATE OF CORRECTION

PATENT NO. : 3,996,646
DATED : 12/14/76
INVENTOR(S) : Jack E. Caveney

It is certified that error appears in the above-identified patent and that said Letters Patent are hereby corrected as shown below:

| | | |
|---|---|---|
| Column 1, | line 16: | "whih" should be --which--, |
| | line 24: | "retograde" should be --retrograde--, |
| Column 3, | line 19: | "alocking" should be --a locking--, |
| Column 4, | line 3: | "preferaly" should be --preferably--, |
| Column 5, | | |
| | line 65: | "generaally" should be --generally--, |
| Column 6, | line 13: | "tha" should be --than--, |
| | line 21: | the word --line-- should be inserted between barb and edge, |
| Column 10, | line 19: | "causes" should be --cause--, |
| Column 11, | line 20: | "is" should be --in--. |

Signed and Sealed this

Third Day of January 1978

[SEAL]

Attest:

RUTH C. MASON
Attesting Officer

LUTRELLE F. PARKER
Acting Commissioner of Patents and Trademarks